United States Patent [19]
Machida

[11] Patent Number: 5,503,008
[45] Date of Patent: Apr. 2, 1996

[54] APPARATUS FOR DIAGNOSING MISFIRE OF MULTI-CYLINDER INTERNAL COMBUSTION ENGINE

[75] Inventor: Kenichi Machida, Atsugi, Japan

[73] Assignee: Unisia Jecs Corporation, Atsugi, Japan

[21] Appl. No.: 366,596

[22] Filed: Dec. 29, 1994

[30] Foreign Application Priority Data

Dec. 29, 1993 [JP] Japan .................................. 5-351677

[51] Int. Cl.$^6$ ................................. G01M 15/00
[52] U.S. Cl. ................................. 73/117.3; 364/431.08
[58] Field of Search ................................. 73/116, 117.3; 123/419, 436; 364/431.08

[56] References Cited

U.S. PATENT DOCUMENTS

| | | | |
|---|---|---|---|
| 4,779,214 | 10/1988 | Kinugasa | 73/116 |
| 4,928,228 | 5/1990 | Fujimoto et al. | 73/117.3 |
| 4,931,940 | 6/1990 | Ogawa et al. | 73/116 |
| 5,044,336 | 9/1991 | Fukui | 73/116 |
| 5,263,453 | 11/1993 | Wakahara et al. | 73/117.3 |
| 5,275,037 | 1/1994 | Nakayama et al. | 73/117.3 |
| 5,337,240 | 8/1994 | Nakagawa et al. | 73/117.3 |
| 5,339,245 | 8/1994 | Hirata et al. | 73/116 |
| 5,361,629 | 11/1994 | McCombie | 73/117.3 |
| 5,379,634 | 1/1995 | Kuroda et al. | 73/116 |
| 5,390,537 | 2/1995 | Kuroda et al. | 73/117.3 |

FOREIGN PATENT DOCUMENTS 5-17172    3/1993    Japan .

*Primary Examiner*—Richard Chilcot
*Assistant Examiner*—Eric S. McCall
*Attorney, Agent, or Firm*—Foley & Lardner

[57] ABSTRACT

The present invention relates to a misfire diagnosing apparatus which can accurately diagnose misfire based on reference signal periods from a drank angle sensor, without influence from inter-cylinder mechanical ununiformity and the like.

While the fuel is cut-off, a fluctuation amount $\Delta TINT$ occurring over a crank angle of 720°, in a reference signal period corresponding to combustion conditions of a learning model cylinder (previously selected from among the plurality of cylinders), is computed and then divided by the number of cylinders n to compute a slope amount X ($=\Delta TINT/n$).

Then for each cylinder, a ratio is computed between an actual period $TINT_i$ measured over the crank angle of 720°, and a theoretical period which is obtained by adding to a period $TINT_0$ of a learning model cylinder #1 initially occurring during a crank angle of 720°, a product of the slope amount X and a cylinder number "i" counted from the learning model cylinder. Individual cylinder correction coefficients $KTINT_i (=TINT_0+i\times X)/TINT_i)$ are then set based on this ratio.

The individual cylinder correction coefficients $KTINT_i$, are then used to correct the actual measured periods $TINT_i$ prior to misfire judgement.

5 Claims, 5 Drawing Sheets

APPARATUS FOR DIAGNOSING MISFIRE OF MULTI-CYLINDER INTERNAL COMBUSTION ENGINE

FIELD OF THE INVENTION

The present invention relates to an apparatus for diagnosing the presence or absence of misfire in a multi-cylinder internal combustion engine, based on the periods of reference signals from a crank angle sensor.

DESCRIPTION OF THE RELATED ART

Conventional apparatuses for diagnosing misfire in a multi-cylinder internal combustion engine successively measure the periods of reference signals generated from a crank angle sensor for each crank angle of 720°/n (where n is the number of cylinders) and corresponding to combustion conditions in the respective cylinders, to determine the presence or absence of misfire depending on fluctuations in the reference signal periods based on the successively measured periods (refer to Japanese Unexamined Utility Model Publication No. 5-17172).

However, when diagnosing misfire in this way depending on fluctuations in the reference signal periods corresponding to combustion conditions in the respective cylinders, since these periods are influenced not only by the presence or absence of misfire but also for example by mechanical uniformity in the ring gear of a crank angle sensor, or by electrical fluctuations in the input circuit to an electromagnetic pick-up, then even with constant engine operating conditions, misfire cannot be accurately diagnosed without first removing these influences.

The present invention takes into consideration such problems with the conventional apparatuses, with the object of improving the accuracy of misfire diagnosis through consideration of (ie. learning) the fluctuations such as intercylinder mechanical ununiformity.

SUMMARY OF THE INVENTION

With this object in view, the present invention is constructed as follows.

As prerequisites for the present invention there is provided, a reference signal generating device for generating for each crank angle of 720°/n (where n is the number of cylinders), a reference signal which includes a cylinder discriminating signal, a period measuring device for measuring reference signal periods corresponding to combustion conditions in the respective cylinders, and a misfire judgement device for judging the presence or absence of misfire in the respective cylinders based on the measured reference signal periods.

Moreover, a period correction device is provided between the period measuring device and the misfire judgement device, for correcting the reference signal periods corresponding to combustion conditions in the respective cylinders obtained by the period measuring device, using correction coefficients for each of the respective cylinders, and judgement by the misfire judgement device is carried out based on the corrected periods.

Furthermore, there is provided a fuel cut-off detecting device for detecting if fuel to the engine is cut-off, as well as a slope amount computing device and a correction coefficient setting device which operate while the fuel is cut-off.

The slope amount computing device computes, during fuel cut-off, a fluctuation amount occurring during a crank angle of 720°, in a reference signal period corresponding to the combustion conditions of a learning model cylinder previously selected from among the plurality of cylinders, and divides this fluctuation amount by the number of cylinders to compute a slope amount.

The correction coefficient setting device computes, for each cylinder, a ratio between an actual period measured during a crank angle of 720° and a theoretical period obtained by adding to a period of the learning model cylinder initially occurring during a crank angle of 720°, a product of the slope amount and the number of the cylinders counted from the learning model cylinder. It then sets individual cylinder correction coefficients based on this ratio.

With the above construction, by correcting prior to misfire judgement, the reference signal periods $TINT_i$ are measured as those corresponding to the combustion conditions in the respective cylinders, and by using the correction coefficients $KTINTi$ for each of the respective cylinders, and by inter-cylinder mechanical ununiformity and the like may be avoided.

In order to achieve this, the inter-cylinder mechanical ununiformity and the like are learned during fuel cut-off, to thus set the correction coefficients $KTINT_i$ for each of the respective cylinders.

This learning will be explained with reference to FIG. 5, which shows a four cylinder internal combustion engine example with an ignition order of #1→#3→#4→#2.

While the fuel is cut-off, a fluctuation amount $\Delta TINT$ ($=TINT_4-TINT_0$) occurring over a crank angle of 720°, in a reference signal period corresponding to the combustion conditions of a learning model cylinder #1 (previously selected from among the plurality of cylinders), is computed and then divided by the number of cylinders n (=4) to compute a slope amount X ($=\Delta TINT/4$).

Then for each cylinder (#3, #4, #2), a ratio is computed between an actual period $TINT_i$ measured over the crank angle of 720°, and a theoretical period which is obtained by adding to a period $TINT_0$ of the learning model cylinder #1 initially occurring during a crank angle of 720°, a product of the slope amount X and the cylinder number "i" counted from the learning model cylinder. The individual cylinder correction coefficients $KTINT_i$ are then set based on this ratio.

More specifically, the equations are as follows:
[For the #3 cylinder]

$$KTINThd\ 1=(TINT_0+1\times X)/TINT_1$$

[For the #4 cylinder]

$$KTINT_2=(TINT_0+2\times X)/TINT_2$$

[For the #2 cylinder]

$$KTINT_3=(TINT_0+3\times X)/TINT_3$$

The individual cylinder correction coefficients $KTINT_i$ set in this way, are then used to correct the actual measured periods $TINT_i$ prior to misfire judgement.

A storage device may also be provided for storing the individual cylinder correction coefficients set by the correction coefficient setting device, in separate engine rotational speed regions.

Moreover, a correction coefficient updating device may be provided for computing a new individual cylinder correction coefficient from a weighted mean of the individual cylinder correction coefficient previously stored in the storage device and the individual cylinder correction coefficient newly set by the correction coefficient setting device, and updating the value stored in the storage device with this new value, The characteristic structure of the present invention and the operation and effects due to this will become apparent from the following illustration of an embodiment given in conjunction with the appended drawings.

DETAILED DESCRIPTION OF A PREFERRED EMBODIMENT

Figure 1:
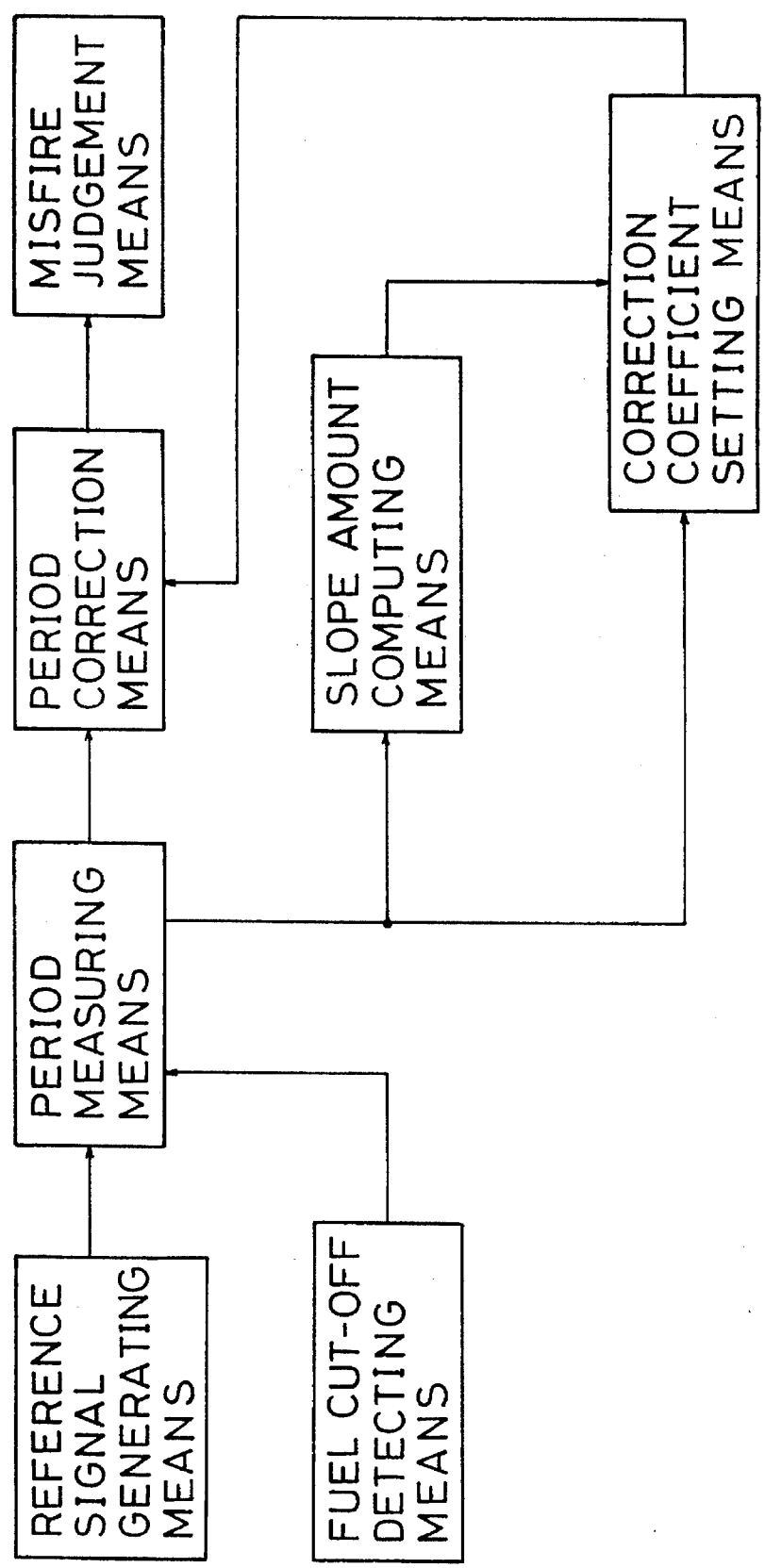
FIG. 1 is a functional block diagram showing a basic structure of the present invention.

A basic structure of an apparatus for diagnosing misfire in a multicylinder internal combustion engine according to the present invention is shown FIG. 1. An embodiment of this apparatus is explained below with reference to FIG. 2 through FIG. 4. This embodiment is for a four cylinder internal combustion engine having an ignition order of #1→#3→#4→#2.

Figure 2:
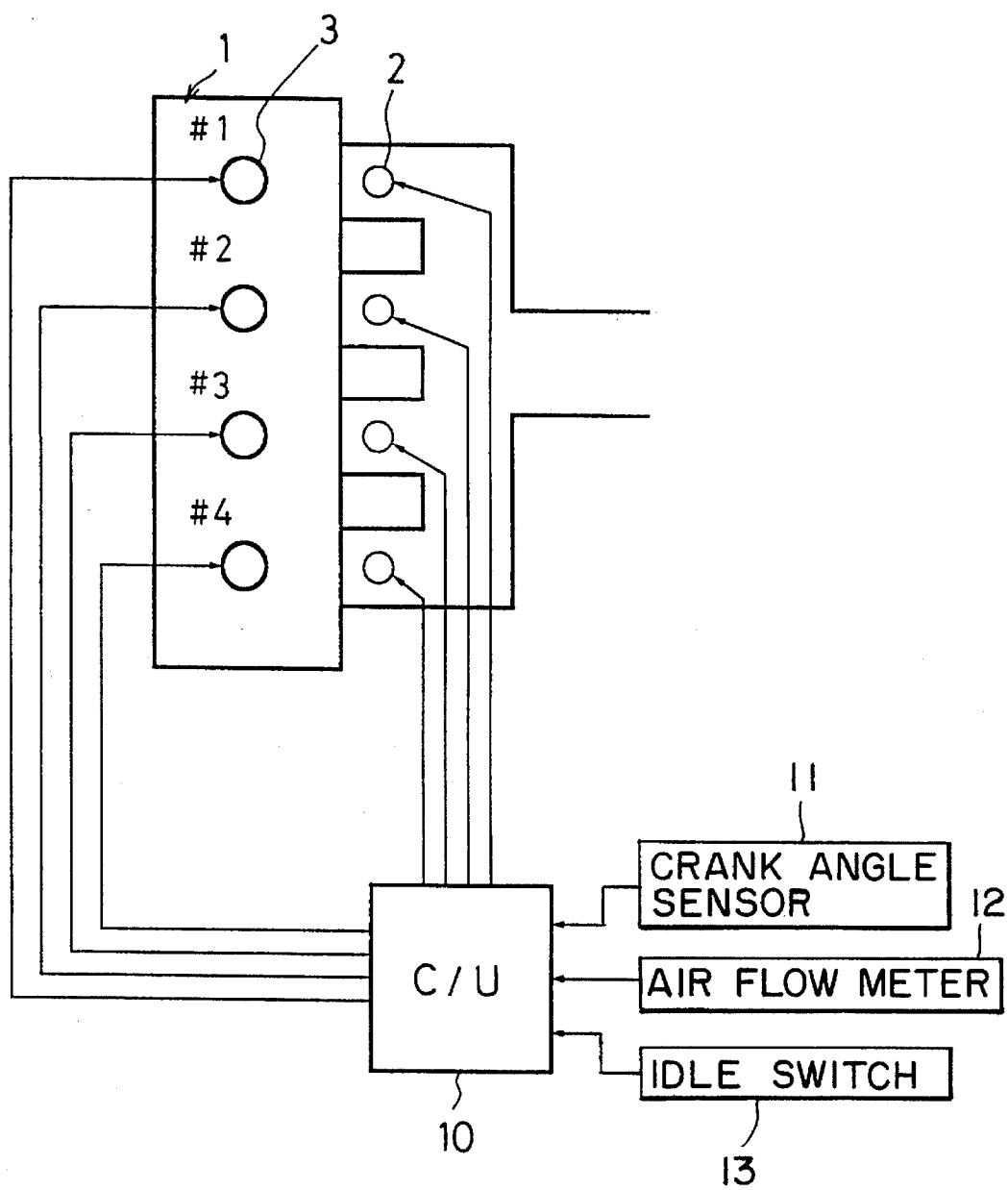
FIG. 2 is a schematic system diagram showing an embodiment of the present invention.

FIG. 2 shows a systematic structure of the present embodiment.

With this embodiment, a control unit 10 incorporating a built-in microcomputer (having a CPU, ROM, RAM etc.), carries out computational processing based on signals from various sensors, to thereby control operation of fuel injection valves 2 and ignition coils 3 provided for each cylinder (#1~ #4) of the engine 1.

For the various sensors, there is provided, for example, a crank angle sensor 11, an air flow meter 12, and an idle switch 13.

The crank angle sensor 11 outputs a reference signal per 180° crank angle, and a unit signal per unit crank angle (1° to 2°). From these signals, the crank angle can be obtained and the engine rotational speed N detected. Included in the reference signal is a cylinder discriminating signal, which may lengthen for example, a lengthened pulse width for the reference signal corresponding to the #1 cylinder, for enabling cylinder discrimination. The crank angle sensor 11 constitutes the reference signal generating device of the present invention.

The air flow meter 12 is, for example, a hot wire type which can detect the intake air quantity Q. The idle switch 13 is one which comes ON when the throttle valve is detected to be in a fully closed position.

With the above arrangement, the control unit 10 computes a basic fuel injection quantity Tp based on the intake air quantity Q and the engine rotational speed N ($Tp=K \times Q/N$ (where K is a constant)), and then makes various corrections on this to determine a final fuel injection quantity Ti ($Ti=Tp \times COEF$ (where COEF is various types of correction coefficients)). Then at a predetermined timing synchronized with engine rotation, the control unit 10 outputs to the fuel injection valves 2 of the respective cylinders, drive pulse signals having a pulse width corresponding to the fuel injection quantity Ti, to thereby effect fuel injection. At the time of deceleration however, the coming ON of the idle switch 13 with the engine rotational speed N above a predetermined fuel cut-off rotational speed, acts as a trigger to stop output of the drive pulse signals to the fuel injection valves 2, thus effecting fuel cut-off. Fuel cut-off is released when the engine rotational speed N falls below a predetermined recovery rotational speed, or when the idle switch 13 goes OFF.

The control unit 10 determines the ignition timing based on the engine rotational speed N and the basic fuel injection quantity Tp, and controls the operation of the ignition coils 3 at this timing to thus cause ignition.

Figure 3:
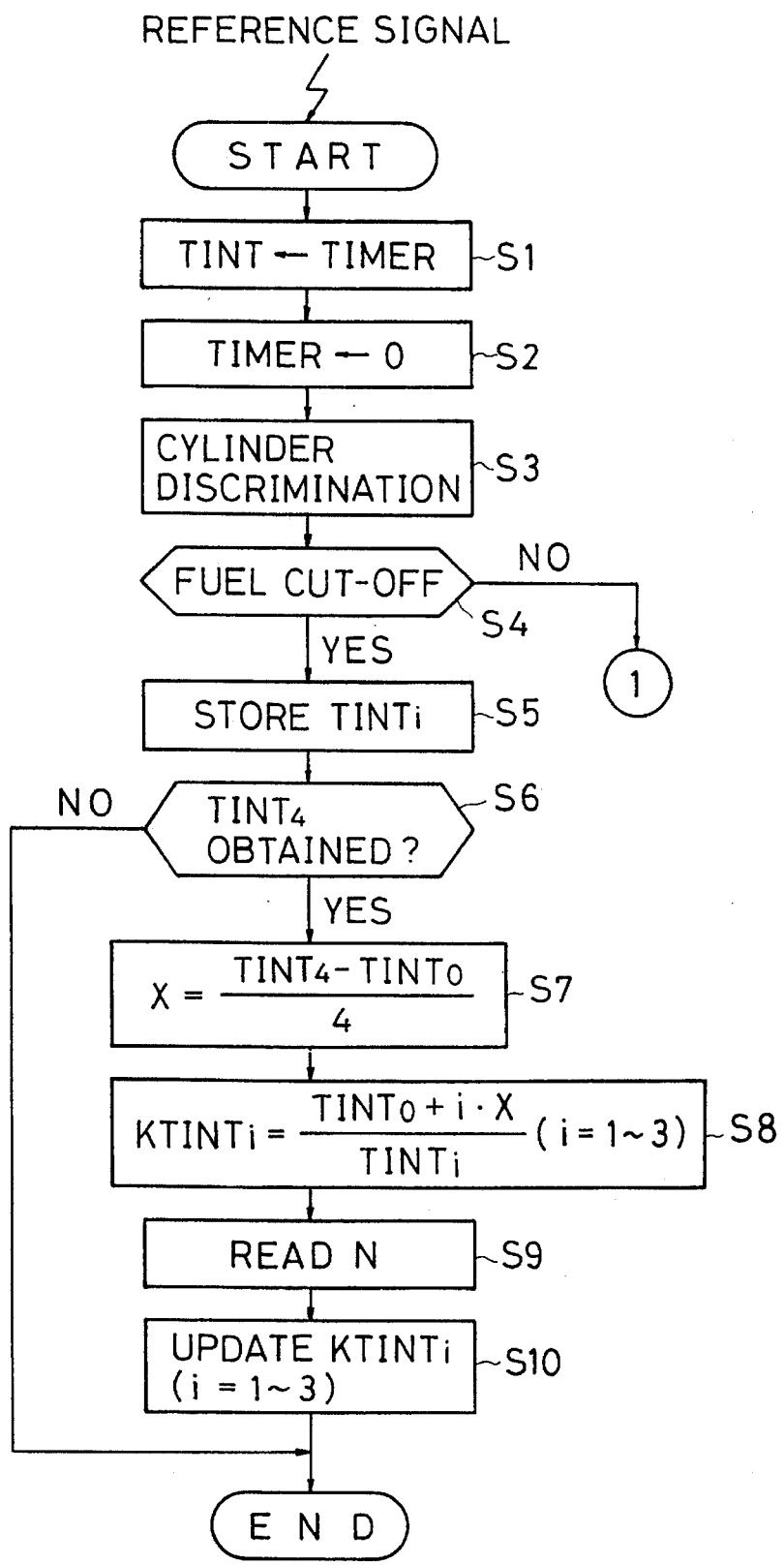
FIG. 3 is a flow chart showing part 1 of a misfire diagnosis routine.
Figure 4:
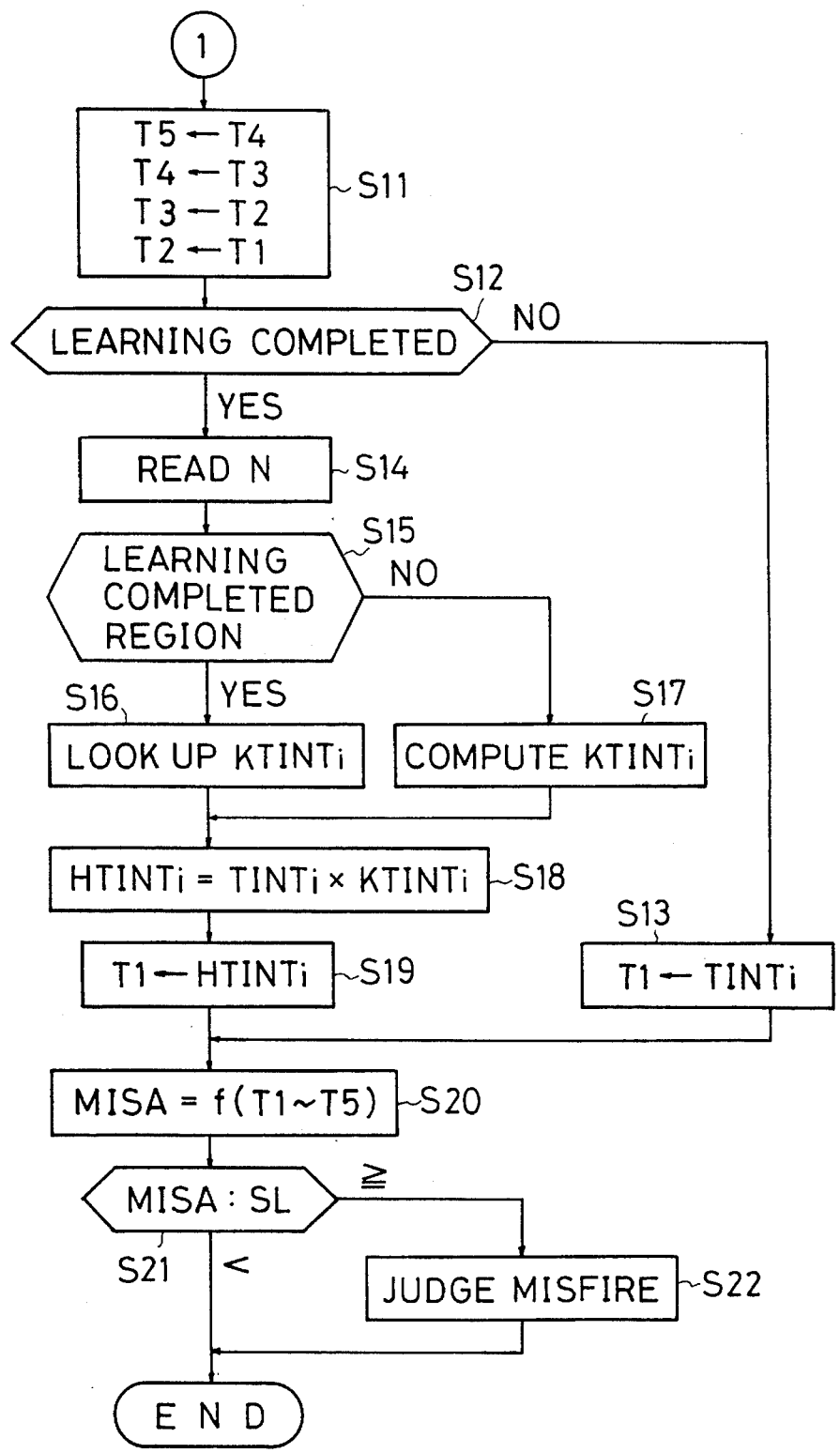
FIG. 4 is a flow chart showing part 2 of the misfire diagnosis routine.

The control unit 10 also determines the presence or absence of misfire in each cylinder according to a misfire detection routine shown in FIG. 3 and FIG. 4, and in predetermined situations generates a warning, for example by means of a warning lamp.

Figure 5:
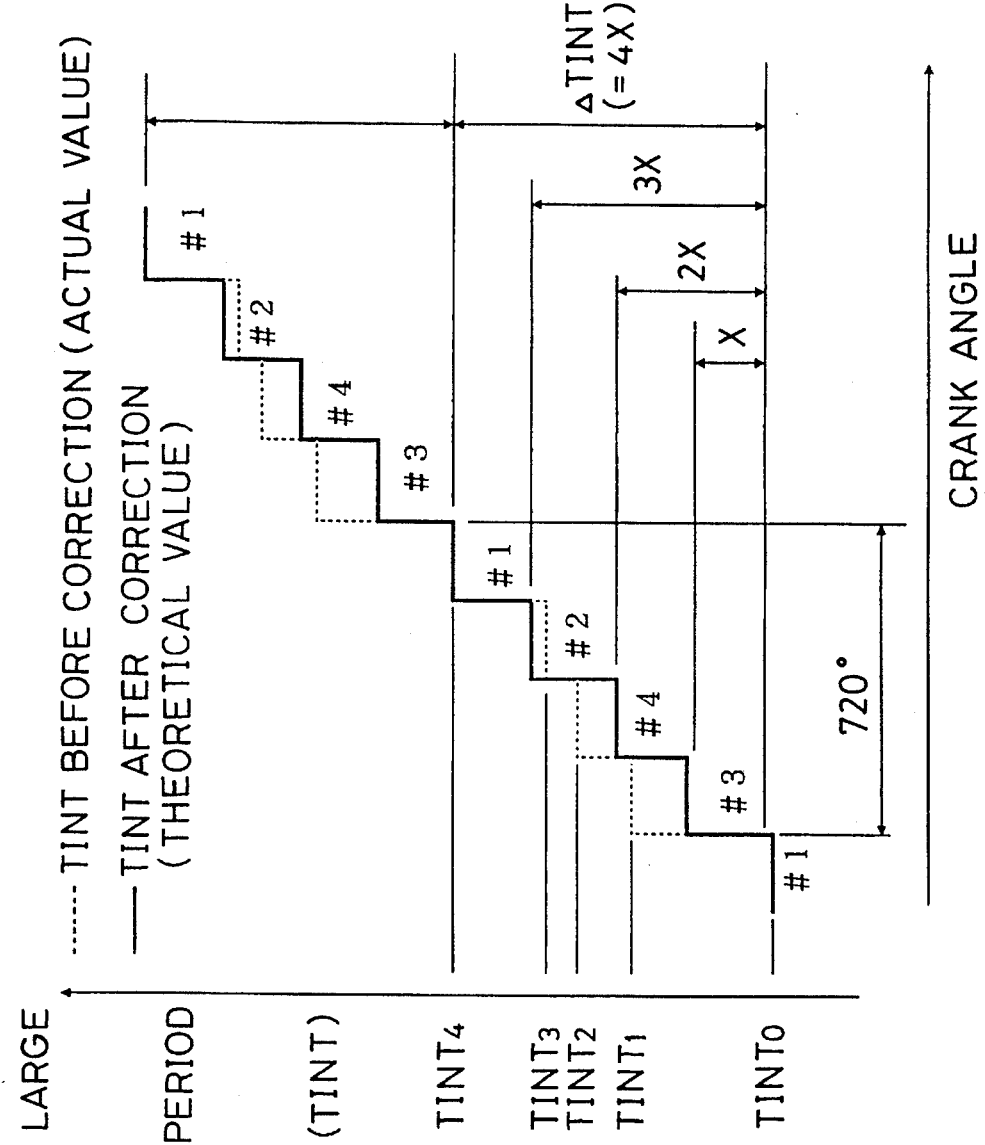
FIG. 5 is a diagram showing aspects of fluctuations in the periods of reference signals at the time of fuel cut-off.

The misfire detection routine in FIG. 3 and FIG. 4 will now be explained with reference to FIG. 5.

The execution of this routine is synchronized with the generation of respective reference signals from the crank angle sensor.

In step 1 (with step indicated by S in the figures), the value of a timer is read and this becomes TINT. The timer is started at "0" in the previous routine, and thus measures the reference signal period TINT. Accordingly, this section corresponds to the period measuring device of the present invention.

In step 2, the timer is reset, starting again at "0".

In step 3, the cylinder is discriminated.

In step 4, it is judged if the fuel is cut-off. This part corresponds to the fuel cut-off detecting device. If the fuel is cut-off, control proceeds to step 5, while if not, control proceeds to step 11.

When the fuel is cut-off

In step 5, the measured reference signal period TINTi is temporarily stored according to the cylinder discrimination result, as the period corresponding to the combustion conditions of the respective cylinder.

More specifically, if the #1 cylinder is the learning model cylinder, then the period when the 190 3 cylinder is discriminated is stored as $TINT_1$, the period when the #4 cylinder is discriminated is stored as $TINT_2$, the period when the #2 cylinder is discriminated is stored as $TINT_3$, and the period when the #1 cylinder is discriminated is stored as $TINT_4$. Moreover, when a new value for $TINT_4$ is stored in memory, then the previous value for $TINT_4$ is stored as $TINT_0$.

In step 6, it is judged if a new value for $TINT_4$ has been obtained. If so, control proceeds to step 7.

In step 7, a fluctuation amount $\Delta TINT(=TINT_4-TINT_0)$ occurring during a crank angle of 720°, in the reference signal period corresponding to the combustion conditions of the learning model cylinder #1, is computed based on the results of the measured periods during fuel cut-off. This value is then divided by the number of cylinders (n=4) to compute a slope amount X (refer to the following equation). Accordingly, this part corresponds to the slope amount computing device of the present invention. $X=(TINT_4-TINT_0)/4$ In step 8, a ratio is computed between the actual period $TINTi(i=1~3)$ measured over the crank angle of 720°, and a theoretical period which is obtained by adding to the period $TINT_0$ of the learning model cylinder #1, the product of the slope amount X and the cylinder number "i" (i=1~3) counted from the learning model cylinder #1. The individual cylinder correction coefficients $KTINT_i$ (i=1~3) are then set based on this ratio (refer to the following equation). Accordingly, this part corresponds to the correction coefficient setting device of the present invention.

$$KTINT_i=(TINT_0+i\times X)/TINT_i$$

More specifically, the equations are as follows:
For the #3 cylinder;

$$KTINT_1=(TINT_0+1\times X)/TINT_1$$

For the #4 cylinder;

$$KTINT_2=(TINT_0+2\times X)/TINT_2$$

For the #2 cylinder;

$$KTINT_3=(TINT_0+3\times X)/TINT_3$$

With the #1 cylinder, since this is the learning model cylinder, then $KTINT_O=KTINT_4=1$, computation is not required.

In step 9, the engine rotational speed N is read.

In step 10, individual cylinder correction coefficients $KTINT_i$ corresponding to the current engine rotational speed N region, are read for each respective cylinder from a map of the individual cylinder correction coefficients stored in RAM (storage device). The individual cylinder correction coefficients $KTINT_i$ are then updated in accordance with the following equation. Accordingly this part corresponds to the correction coefficient updating device of the present invention.

$$KTINT_{i-new}=(1/a)\times KTINT_i+(1-1/a)\times KTINT_{i-old}$$

On the right side of this equation, $KTINT_i$ is the computed value from step 8, and $KTINT_{i-old}$ is the value read from the map, while on the left side, $KTINT_{i-new}$ is the update value to be written to the map.

The updated results are then written to the individual cylinder correction coefficient maps, for each respective cylinder.

When the fuel is not cut-off

In step 11, in the case of four cylinders, the five latest values for the reference signal periods (T1–T5) are stored, and since misfire is determined based on these values, they replace the previously used values as follows; T5←T4, T4←T3, T3←T2, T2←T1

In step 12, it is judged if learning has been completed (ie., at least one learning cycle has been completed). If learning has not been carried out at all, control proceeds to step 13, where the latest measured period TINTi is made T1 without change, and control proceeds to step 20.

If, however, learning has been carried out for even one cycle, control proceeds to step 14.

In step 14, the engine rotational speed N is read to determine the region.

In step 15, it is judged if the region is one for which learning has been completed. If so, control proceeds to step 16.

In step 16, the individual cylinder correction coefficient $KTINT_i$ corresponding to the current engine rotational speed N region is read from the map of the individual cylinder correction coefficients for the discriminated cylinder.

In the case of an unlearnt region, control proceeds to step 17, where data is read from an adjacent region for which learning has been completed, and an individual cylinder correction coefficient $KTINT_i$ is set by computation involving multiplying this data by a coefficient K1 which is inversely proportional to the engine rotational speed N.

In step 18, the latest measured reference signal period $KTINT_i$ is corrected by the individual cylinder correction coefficient $TINT_i$ to obtain a corrected period $HTINT_i$ according to the following equation. Accordingly, this part corresponds to the period correction device of the present invention. $HTINT_i=TINT_i\times KTINT_i$ In step 19, the corrected period $HTINT_i$ is made T1 and control proceeds to step 20.

In step 20, a misfire judgement value MISA is computed according to the following equation using the five latest values for the reference signal periods (T1 through T5). Here, T1 represents the present period for the currently discriminated cylinder which is being subjected to misfire judgement, while T5 represents the period for that cylinder one cycle beforehand.

$$MISA=(3\times(T4-T5)+(T4-T1))/T5^3$$

In step 21, the misfire judgement value MISA is compared with a reference value SL. If MISA≧SL, control proceeds to step 22 where misfire is judged to have occurred. Accordingly, the part covered by steps 20 through 22 corresponds to the misfire judgement device of the present invention.

The misfire judgement reference value SL is preferably set in accordance with engine rotational speed N and basic fuel injection quantity Tp, using a map with these as parameters.

Furthermore, instead of using the abovementioned MISA value as the misfire judgement value, the following MISB value may be used:

$$MISC=(2\times(T3-T5)+2\times(T3-T1))/T5^3$$

Moreover, with this MISB value, the three latest values (MISB1 through MISB3) may be placed in memory, and the following MISC value used as the misfire judgement value.

$$MISC=MISB2-MISB3$$

With these misfire judgement values also, misfire is judged to have occurred if MISB≧a predetermined value or MISC≧a predetermined value.

When misfire is judged to have occurred, then as well as discriminating the misfiring cylinder, a warning signal or the like may be generated corresponding for example to the number of successive misfires.

The present invention as described above enables accurate misfire diagnoses without influence from inter-cylinder fluctuations, due for example to mechanical ununiformity, or to electrical fluctuations in a sensor input circuit. The invention thus has considerable industrial applicability.

I claim:

1. An apparatus for diagnosing misfire in a multi-cylinder internal combustion engine, said apparatus comprising:

reference signal generating means for generating, for each crank angle of 720°/n (where n corresponds to a number of cylinders in the internal combustion engine), a reference signal which includes a cylinder discriminating signal;

period measuring means for measuring reference signal periods which correspond to combustion conditions in respective cylinders of the internal combustion engine;

misfire judgement means for judging a presence or absence of misfire in the respective cylinders based on the measured reference signal periods;

period correction means, provided between said period measuring means and said misfire judgment means, for correcting the reference signal periods corresponding to combustion conditions in the respective cylinders obtained by the period measuring means, using correction coefficients for each of the respective cylinders, wherein judgment by the misfire judgement means is carried out based on the corrected reference signal periods;

fuel cut-off detecting means for detecting if fuel to the internal combustion engine is cut-off;

slope amount computing means for computing, during fuel cut-off, a fluctuation amount occurring during a crank angle of 720°, in a reference signal period corresponding to the combustion conditions of a learning model cylinder previously selected from among the respective cylinders, and for dividing the fluctuation amount by the number of cylinders to compute a slope amount;

correction coefficient setting means for computing, for each respective cylinder, a ratio between an actual period measured during a crank angle of 720° and a theoretical period obtained by adding to a period of the learning model cylinder initially occurring during a crank angle of 720°, a product of the slope amount and the number of the cylinders counted from the learning model cylinder, and based on this ratio, for setting individual cylinder correction coefficients;

storage means for storing the individual cylinder correction coefficients set by the correction coefficient setting means, in separate engine rotational speed regions; and correction coefficient updating means for computing a new individual cylinder correction coefficient from a weighted mean of an individual cylinder correction coefficient previously stored in the storage means and an individual cylinder correction coefficient newly set by said correction coefficient setting means, and for updating the individual cylinder correction coefficients stored in the storage means with the new individual cylinder correction coefficient.

2. An apparatus for diagnosing misfire in an internal combustion engine, said apparatus comprising:

reference signal generating means for generating, for each crank angle of 720°/n, where n corresponds to a number of cylinders in the internal combustion engine, a reference signal which includes a cylinder discriminating signal;

period measuring means for measuring reference signal periods TINTi, i being an integer from 1 to n, the reference signal periods corresponding to combustion conditions in each respective cylinder of the internal combustion engine;

misfire judgement means for judging a presence or absence of misfire in each respective cylinder based on the measured reference signal periods TINTi;

period correction means, provided between said period measuring means and said misfire judgment means, for correcting the reference signal periods TINTi corresponding to combustion conditions in each respective cylinder obtained by the period measuring means, by using cylinder correction coefficients KTINTi for each respective cylinder, wherein judgment by the misfire judgement means is carried out based on the corrected reference signal periods;

fuel cut-off detecting means for detecting if fuel to the internal combustion engine is cut-off;

slope amount computing means for computing, during fuel cut-off, a fluctuation amount $\Delta$TINT occurring during a crank angle of 720°, in a reference signal period corresponding to the combustion conditions of a learning model cylinder previously selected from among the respective cylinders of the engine, and for dividing the fluctuation amount $\Delta$TINT by the number of cylinders n to compute a slope amount X; and correction coefficient setting means for computing, for each respective cylinder, the cylinder correction coefficients KTINTi, i being an integer from 1 to n corresponding to each respective cylinder, according to an equation given below:

$$KTINTi=(TINT0+(i * X))/TINTi,$$

wherein the cylinder correction coefficient KTINTi for each respective cylinder is used by the period correction means to correct the measured reference signal periods TINTi for each respective cylinder prior to the judgement made by the misfire judgment means.

3. An apparatus for diagnosing misfire in an internal combustion engine as claimed in claim 2, further comprising storage means for storing individual cylinder correction coefficients set by the correction coefficient setting means, in separate engine rotational speed regions.

4. An apparatus for diagnosing misfire in an internal combustion engine as claimed in claim 3, further comprising correction coefficient updating means for computing a new individual cylinder correction coefficient from a weighted mean of an individual cylinder correction coefficient previously stored in the storage means and an individual cylinder correction coefficient newly set by the correction coefficient setting means, and for updating the value stored in the storage means with the new value.

5. A method for diagnosing misfire in an internal combustion engine which includes n cylinders, n being an integer greater than 1, comprising the steps of:

a) measuring a reference signal period TINT0 of one of the n cylinders with respect to a timer value;

b) discriminating which of the n cylinders the reference signal TINT0 is based on;

c) judging whether fuel is cut-off from the engine, and if the fuel is cut-off from the engine, performing the following steps (d) through (i):

d) determining and storing a measured reference signal period TINTi for each of the n cylinders as a respective period corresponding to a combustion condition of the respective n cylinders;

e) determining a fluctuation time amount $\Delta$TINT that occurs during a crank angle of 720°, in a reference signal period corresponding to the combustion condition of the one of the n cylinders discriminated in the step b);

f) dividing the fluctuation amount $\Delta$TINT by the number n;

g) determining a ratio between the measured reference signal period TINTi over the crank angle of 720° and a theoretical reference period KTINTi for each of the respective n cylinders according to:

$$KTINTi = (TINT0 + (i * X)/TINTi)), ps$$

where i is an integer from 1 to n, and where i corresponds to a cylinder designation;

h) reading a rotational speed of the engine; and i) updating the theoretical reference period KTINTi based on the rotational speed of the engine.

* * * * *